(12) United States Patent
Niemann

(10) Patent No.: US 11,220,212 B2
(45) Date of Patent: Jan. 11, 2022

(54) CIRCUIT ASSEMBLY OF A LIGHTING UNIT OF A HEADLIGHT FOR A VEHICLE

(71) Applicant: HELLA GMBH & CO. KGAA, Lippstadt (DE)

(72) Inventor: Boris Niemann, Boeblingen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 34 days.

(21) Appl. No.: 16/869,695

(22) Filed: May 8, 2020

(65) Prior Publication Data

US 2020/0267821 A1 Aug. 20, 2020

Related U.S. Application Data

(63) Continuation of application No. PCT/EP2018/080158, filed on Nov. 5, 2018.

(30) Foreign Application Priority Data

Nov. 8, 2017 (DE) ...................... 10 2017 126 044.7

(51) Int. Cl.
- *B60Q 11/00* (2006.01)
- *H05B 47/24* (2020.01)
- *H05B 45/56* (2020.01)
- *B60Q 1/04* (2006.01)

(52) U.S. Cl.
CPC ................ *B60Q 11/00* (2013.01); *B60Q 1/04* (2013.01); *H05B 45/56* (2020.01); *H05B 47/24* (2020.01)

(58) Field of Classification Search
CPC ........ H05B 45/56; H05B 45/28; H05B 47/24; H05B 47/28; B60Q 1/04
See application file for complete search history.

(56) References Cited

U.S. PATENT DOCUMENTS

| 8,760,068 B1 * | 6/2014 | Viviani | H05B 45/20 315/224 |
| 9,554,430 B2 | 1/2017 | Limmer et al. | |
| 2009/0273300 A1 * | 11/2009 | Kayser | H05B 45/40 315/291 |
| 2011/0211332 A1 * | 9/2011 | Hilscher | F21V 29/70 362/84 |

(Continued)

FOREIGN PATENT DOCUMENTS

| DE | 10 2011 055 594 A1 | 5/2013 |
| DE | 10 2012 224 348 A1 | 1/2014 |

(Continued)

*Primary Examiner* — Amy Cohen Johnson
*Assistant Examiner* — Syed M Kaiser
(74) *Attorney, Agent, or Firm* — Muncy, Geissler, Olds & Lowe, P.C.

(57) ABSTRACT

A circuit arrangement for the electrical wiring of a light unit of a headlight for a vehicle, having a control unit which is connected to a power supply, the light unit having at least one semiconductor light source and a temperature measurer, wherein the semiconductor light source has a cathode and wherein the temperature measurer has a cathode, and wherein the light unit has an equipotential bonding contact. In the light unit, the cathodes are electrically connected to one another and/or at least one of the cathodes is electrically connected to the equipotential bonding contact in the light unit.

11 Claims, 3 Drawing Sheets

(56) References Cited

U.S. PATENT DOCUMENTS

| | | | |
|---|---|---|---|
| 2011/0233759 A1* | 9/2011 | Shiga | H01L 23/4952 257/735 |
| 2012/0188172 A1* | 7/2012 | Fong | A61L 2/10 345/173 |
| 2013/0049582 A1* | 2/2013 | West | F21V 23/0428 315/33 |
| 2013/0070452 A1* | 3/2013 | Urano | F21K 9/27 362/231 |
| 2013/0335975 A1* | 12/2013 | Park | G02B 6/0055 362/297 |
| 2015/0103526 A1* | 4/2015 | Johnson | F26B 3/30 362/249.06 |
| 2016/0252221 A1* | 9/2016 | Maglica | F21V 23/0428 362/202 |
| 2016/0290620 A1 | 10/2016 | Ichikawa et al. | |
| 2018/0146523 A1* | 5/2018 | Nakatani | H05B 45/54 |
| 2018/0270927 A1* | 9/2018 | Daroussin | B60Q 1/04 |
| 2019/0160996 A1* | 5/2019 | Nishio | B60Q 1/085 |
| 2020/0240594 A1* | 7/2020 | Jiang | F21V 19/009 |

FOREIGN PATENT DOCUMENTS

| | | |
|---|---|---|
| DE | 20 2015 102 078 U1 | 9/2016 |
| EP | 1 814 302 A1 | 12/2014 |

\* cited by examiner

CIRCUIT ASSEMBLY OF A LIGHTING UNIT OF A HEADLIGHT FOR A VEHICLE

This nonprovisional application is a continuation of International Application No. PCT/EP2018/080158, which was filed on Nov. 5, 2018, and which claims priority to German Patent Application No. 10 2017 126 044.7, which was filed in Germany on Nov. 8, 2017, and which are both herein incorporated by reference.

BACKGROUND OF THE INVENTION

Field of the Invention

The present invention relates to a circuit arrangement for the electrical wiring of a light unit of a headlight for a vehicle, with a control unit connected to a power supply, wherein the light unit comprises at least one semiconductor light source and a temperature measurer, wherein the semiconductor light comprises a cathode and wherein the temperature measurer has a negative terminal, and wherein the light unit comprises an equipotential bonding contact.

Description of the Background Art

DE 10 2011 055 594 A1 discloses a circuit arrangement for the electrical wiring of a light unit of a headlight for a vehicle, with a control unit connected to a power supply, wherein the light unit has a plurality of semiconductor light sources and a temperature measurer, wherein the semiconductor light source comprises a cathode and wherein the temperature measurer has a negative terminal, and wherein the light unit comprises an equipotential bonding contact.

Disadvantageously, the negative terminals and the cathodes are each led out of the light unit as separate contacts, which must also be connected separately to a control unit. The light unit is usually located in the headlight, and the semiconductor light sources for generating the light function are arranged on the light unit itself. By contrast, the control unit is often located outside the headlight housing, so that a multipole line is required to connect the light unit to the control unit. The fact that the parts are each formed separately as line connections between the light unit and the control unit results in a large number of necessary contacts between the light unit and the control unit, which also means that the housing and the circuit board of the light unit and the control unit need to be sized accordingly.

SUMMARY OF THE INVENTION

It is therefore an object of the present invention to improve a circuit arrangement for electrical wiring of a light unit of a headlight for a vehicle with a control unit. In particular, it is the object of the invention to reduce the number of line connections between the light unit and the control unit. In addition, the structure of the circuit arrangement with regard to the necessary construction space will be reduced. Furthermore, the object is to reduce the number of plug-in contacts between the light unit and the control unit.

In an exemplary embodiment, the light unit, the cathode and the negative terminal may be electrically connected and/or the cathode and/or the negative terminal may be electrically connected with the equipotential bonding contact in the light unit.

An example provides the merging of contacts between the light unit and the control unit, wherein the contacts, the negative terminals or the cathodes pertain to the components arranged in the light unit. The temperature measurer is used to monitor the temperature of the at least one semiconductor light source and is therefore disposed close to the semiconductor light source. The equipotential bonding contact is connected to the ground of a power supply, wherein the connection ensures equipotential bonding in such a way that such equipotential bonding contacts are also referred to as "ESD electrostatic discharge" devices. Usually, such equipotential bonding contacts are directly connected to the negative terminal of a vehicle battery. However, in the present invention it is provided that such an equipotential bonding contact is optionally directly connected to the negative terminal of the power supply via the control unit. Alternatively, or additionally, the cathode of the semiconductor light source or of the negative terminal of the temperature measurer can optionally be brought together, wherein a minimum number of lines are employed if the cathode of the semiconductor light source, the negative terminal, the temperature measurer and also the equipotential bonding contact are electrically connected, wherein the electrical connection is formed within the light unit, in particular within a common circuit board.

The cathode of the semiconductor light source, the negative terminal of the temperature measurer and the equipotential bonding contact in the light unit are electrically connected to each other. If only one semiconductor light source is arranged in the light unit, the light unit can already have only three connection contacts, namely the anode of the semiconductor light source, the positive terminal of the temperature measuring device and the common ground wire, formed of the cathode of the semiconductor light source, the negative terminal of the temperature measurer and the equipotential bonding contact.

The cathode of the semiconductor light source and the negative terminal of the temperature measurer can be electrically connected to each other, wherein the equipotential bonding contact is connected to the negative terminal of the power supply via a line connection.

The cathode of the semiconductor light source can be electrically connected to the equipotential bonding contact in the light unit, wherein the negative terminal of the temperature measurer is electrically connected to the control unit via a negative terminal line.

The negative terminal of the temperature measurer can be electrically connected to the equipotential bonding contact in the light unit, wherein the cathode of the semiconductor light source is electrically connected to the control unit via the cathode line.

Surprisingly, it has been shown that despite the significantly different currents between the power ground of the cathode of the semiconductor light source and the proof mass of the negative terminal of the temperature measurer, it is possible to merge the earth terminal, so that temperature measurement with the temperature measurer is nevertheless possible. For this purpose, special configurations of the ground wire between the light unit and the control unit are used, in particular to minimize transition resistances. Usually, the current of the negative terminal of the temperature measurer has a value which is one or more powers of ten below the value which results from the current inflow of the cathode of the semiconductor light source. However, by merging the ground wires, it could be determined that with the special precautions for designing the common ground wire, temperature measurement with the temperature measurer is possible without being influenced by the operation of the semiconductor light source.

According to a further aspect of the invention, the light unit has a printed circuit board on which the electrical connection of the cathode and negative terminal and/or the electrical connection of the cathode and/or the negative terminal is formed with the equipotential bonding contact. The wiring of the semiconductor light source and the temperature measurer according to the invention is in particular limited to the design of the printed circuit board. For the purposes of the invention, the cathode, the negative terminal and/or the equipotential bonding contact are not brought together outside the light unit but within the same, in particular on the printed circuit board.

With one semiconductor light source, the light unit can have three electrical contacts, wherein each further arrangement of a semiconductor light source adds a further electrical contact. The circuit arrangement in particular has no line connection from the equipotential bonding contact to the negative terminal of the power supply. All contacting of the light unit takes place directly to or in the control unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
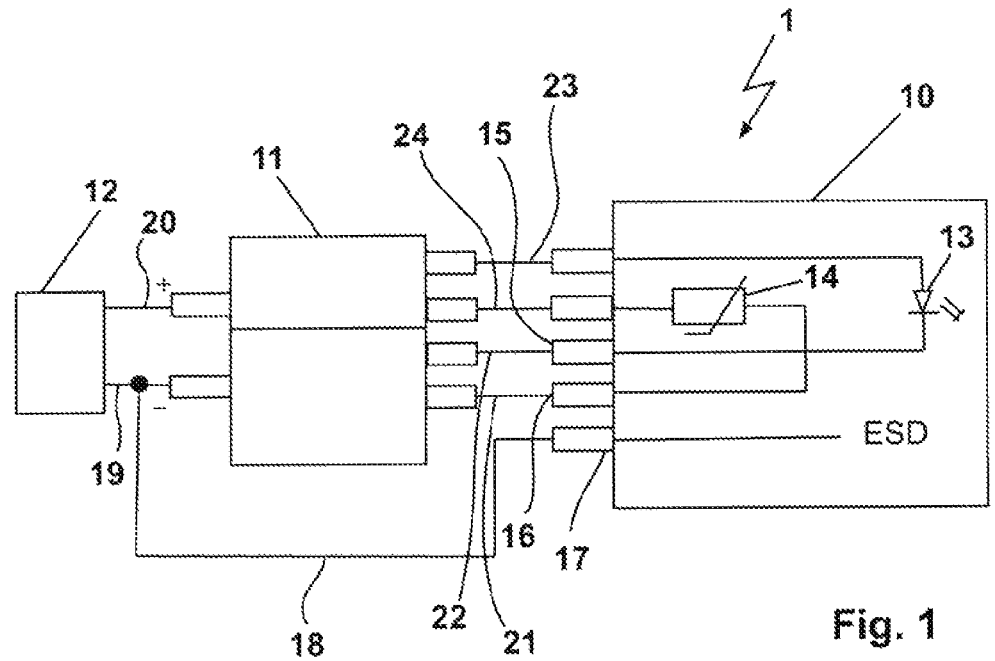
FIG. 1 shows a circuit arrangement for wiring a light unit of a headlight according to the prior art.

FIG. 1 shows the view of a circuit arrangement 1 according to the state of the art. The circuit arrangement 1 comprises a light unit 10, which is arranged, for example, within the housing of a headlight for a vehicle, and receives at least one semiconductor light source that can mimic light to produce a light function. In the immediate structural vicinity of the semiconductor light source, at least one temperature measurer 14 is located in the light unit 10 to monitor the temperature of the semiconductor light source 13. The light unit 10 is connected to a control unit 11 to control the semiconductor light source 13 and to evaluate the measurement signals of the temperature measurer 14, and the control unit 11 is powered by a power supply 12.

The light unit 10 has five connection contacts, including the cathode 15 of the semiconductor light source 13, the negative terminal 16 of the temperature measurer 14 and an equipotential bonding contact 17 which is labeled "ESD" (electrostatic discharge). Furthermore, the light unit comprises a positive terminal line 23 of the semiconductor light source 13 and a positive terminal line 24 of the temperature measurer 14. This results in five connection contacts for the light unit 10, wherein the equipotential bonding contact 17 is connected via a line connection 18 to the negative terminal 19 of the power supply 12, which furthermore has a positive terminal 20, and the negative terminal 19 and the positive terminal 20 are connected to the control unit 11.

FIGS. 2, 3, 4 and 5 each show a circuit arrangement 1 with the wiring of the light unit 10 being carried out according to the invention, wherein the figures show different design variants. FIGS. 2 to 5 each show a light unit 10 which is connected to a control unit 11, and between the light unit 10 and the control unit 11 there are a number of line connections, including the cathode 15 of the semiconductor light source 13, the negative terminal 16 of the temperature measurer 14 and the equipotential bonding contact 17 with the line connection 18 to contact the negative terminal 19 of the power supply 12, wherein depending on the exemplary embodiment not all lines are occupied. The control unit 11 is connected to the negative terminal 19 and the positive terminal 20 of the power supply 12.

Figure 2:
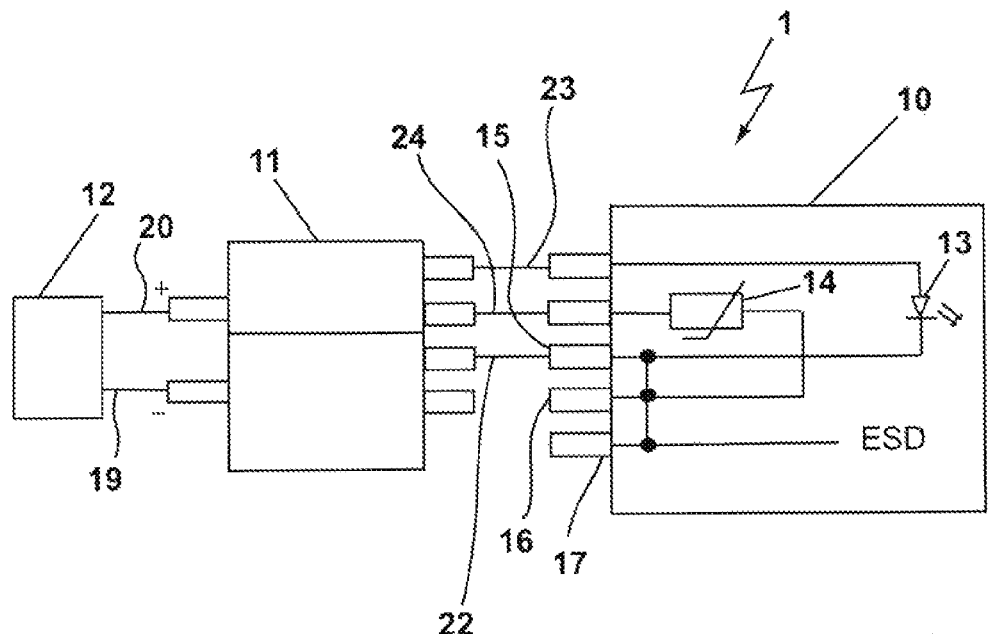
FIG. 2 shows an exemplary embodiment of a circuit arrangement according to the invention.

The exemplary embodiment according to FIG. 2 shows an interconnection of the cathode 15 of the semiconductor light source 13 with the negative terminal 16 of the temperature measurer 14 and with the equipotential bonding contact 17. Consequently, the line connection 18 is omitted; furthermore, the negative terminal line 21 for connecting the negative terminal of the temperature measurer 14 to the control unit 11 is omitted. By means of the multiple interconnection of the parts of both the semiconductor light source 13 and the temperature measurer 14 and together with the equipotential bonding contact 17, the light unit 10 only has three necessary contacts.

Figure 3:
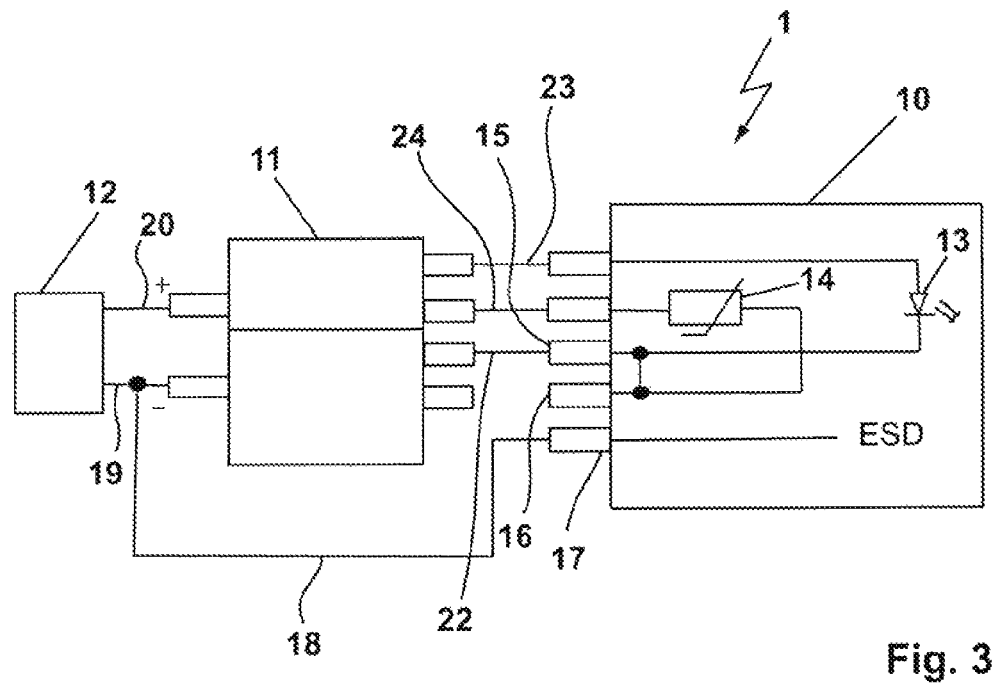
FIG. 3 shows an exemplary embodiment of the circuit arrangement according to the invention.

FIG. 3 shows an exemplary embodiment in which the cathode 15 of the semiconductor light source 13 is connected to the negative terminal 16 of the temperature measurer 14, wherein the equipotential bonding contact 17 is connected to the negative terminal 19 of the power supply 12 in a conventional manner via the line connection 18.

Figure 4:
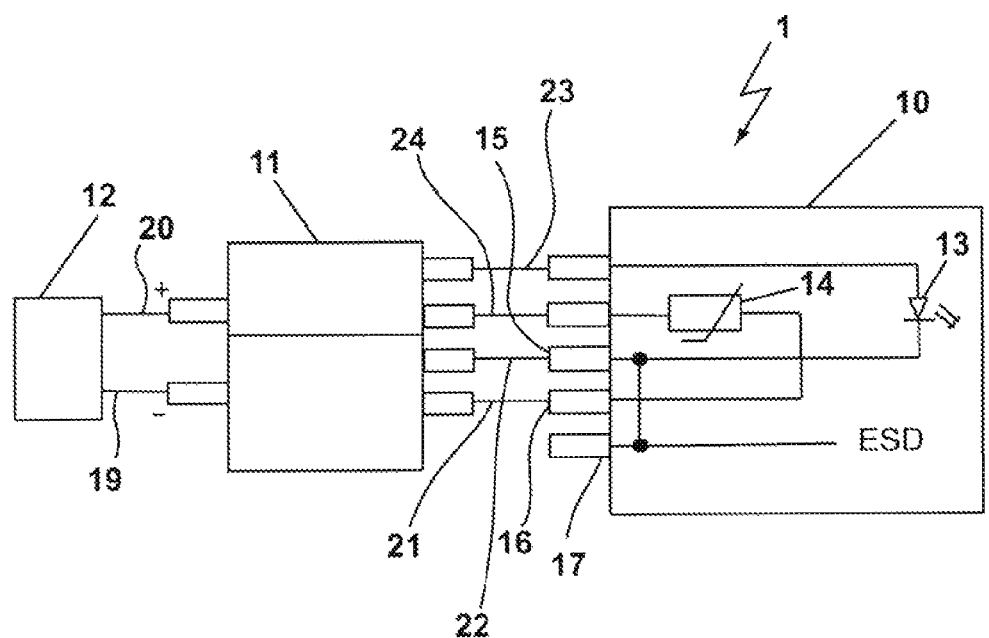
FIG. 4 shows an exemplary embodiment of the circuit arrangement according to the invention.

FIG. 4 shows an exemplary embodiment in which the cathode 15 of the semiconductor light source 13 is connected to the equipotential bonding contact 17, wherein the negative terminal 16 of the temperature measurer 14 is connected to the control unit 11 via the negative terminal line 21 in a conventional manner. According to this exemplary embodiment, the equipotential bonding contact 17 is not connected to the control unit 11 via the line connection 18 but instead via the cathode line 22, together with the contacting of the cathode 15 of the semiconductor light source 13.

Figure 5:
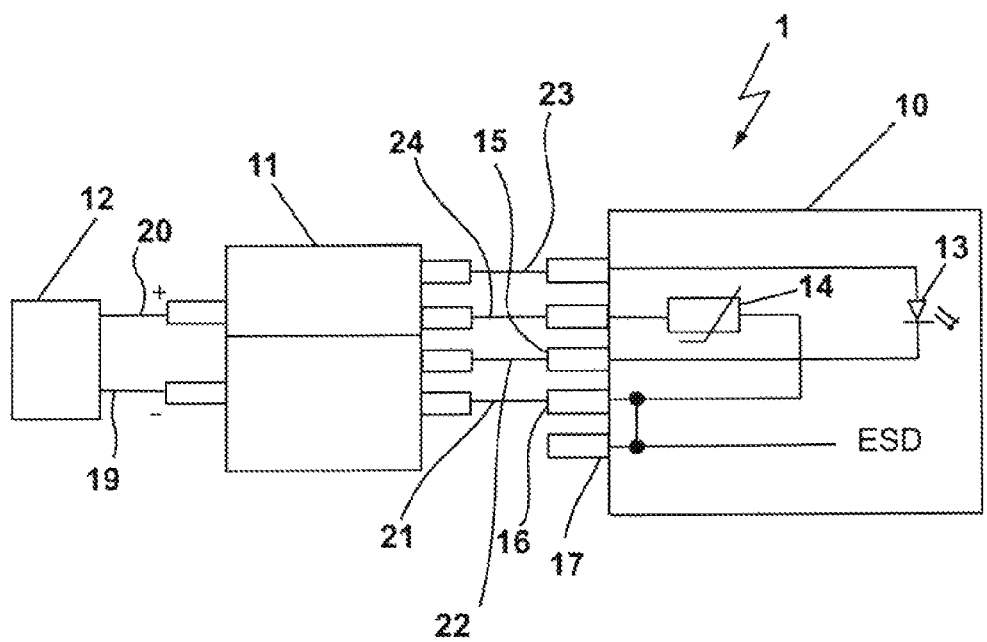
FIG. 5 shows an exemplary embodiment of the circuit arrangement according to the invention.

Finally, FIG. 5 shows an exemplary embodiment in which the negative terminal 16 of the temperature measurer 14 is connected to the equipotential bonding contact 17 within the light unit 10, and the cathode 15 of the semiconductor light source 13 is connected to the control unit 11 via the cathode line 22. In this case, the negative terminal line 21 of the temperature measurer 14 also connects the equipotential bonding contact 17 to the control unit 11.

The embodiment of the invention is not limited to the above exemplary embodiment. Rather, a number of variants are conceivable which make use of the solution shown, even in the case of fundamentally different embodiments. Features and/or advantages proceeding from the claims, the description or the drawings, including structural details, spatial arrangements and method steps, can be essential to the invention both alone and also in the various combinations.

What is claimed is:

1. A circuit arrangement for electrical wiring of a light unit of a headlight for a vehicle, the circuit arrangement comprising:
a control unit connectable to a power supply;
at least one semiconductor light source; and
a temperature measurer,
wherein the semiconductor light source comprises a cathode connecting to the power supply,
wherein the temperature measurer comprises a negative terminal,
wherein the light unit comprises an equipotential bonding contact, and
wherein the cathode and the negative terminal are electrically connected to each other,
wherein the cathode or the negative terminal are electrically connected with the equipotential bonding contact in the light unit, and
wherein the equipotential bonding contact connects to the power supply via the cathode or the negative terminal.

2. The circuit arrangement according to claim 1, wherein the cathode of the semiconductor light source, the negative terminal of the temperature measurer and the equipotential bonding contact in the light unit are electrically connected to each other.

3. The circuit arrangement according to claim 1, wherein the cathode of the semiconductor light source and the negative terminal of the temperature measurer are electrically connected to each other.

4. The circuit arrangement according to claim 1, wherein the cathode of the semiconductor light source is connected electrically with the equipotential bonding contact in the light unit, and wherein the negative terminal of the temperature measurer is electrically connected with the control unit via a negative terminal line.

5. The circuit arrangement according to claim 4, wherein the equipotential bonding contact connects to the power supply and the control unit via the cathode of the semiconductor light source.

6. The circuit arrangement according to claim 1, wherein the negative terminal of the temperature measurer is electrically connected to the equipotential bonding contact in the light unit, wherein the cathode of the semiconductor light source is electrically connected to the control unit via a cathode line.

7. The circuit arrangement according to claim 6, wherein the equipotential bonding contact connects to the power supply and the control unit via the cathode of the semiconductor light source.

8. The circuit arrangement according to claim 1, wherein the light unit has a printed circuit board on which the electrical connection of the cathode and the negative terminal and/or the electrical connection of the cathode and/or the negative terminal is formed with the equipotential bonding contact.

9. The circuit arrangement according to claim 1, wherein the light unit comprises three electrical contacts including the cathode of the semiconductor light source, the negative terminal of the temperature measurer, and the equipotential bonding contact, and wherein an additional electrical contact is provided on the light unit for the cathode of each additional semiconductor light source of the at least one semiconductor light source.

10. The circuit arrangement according to claim 1, wherein a voltage return path from the temperature detector to the power supply is the cathode of the semiconductor light source.

11. A circuit arrangement for electrical wiring of a light unit of a headlight for a vehicle, the circuit arrangement comprising:
a control unit connectable to a power supply;
at least one semiconductor light source; and
a temperature measurer,
wherein the semiconductor light source comprises a cathode,
wherein the temperature measurer comprises a negative terminal,
wherein the light unit comprises an equipotential bonding contact, and
wherein the cathode and the negative terminal are electrically connected to each other,
wherein the cathode or the negative terminal are electrically connected with the equipotential bonding contact in the light unit, and
wherein the circuit arrangement is designed without a line connection from the equipotential bonding contact to the negative terminal of the power supply.

* * * * *